(12) United States Patent
Stokes et al.

(10) Patent No.: US 8,044,825 B2
(45) Date of Patent: Oct. 25, 2011

(54) AIRCRAFT SECURITY

(75) Inventors: Peter David Stokes, Norfolk (GB); Sean Patrick O'Kell, Norfolk (GB)

(73) Assignee: Saf-T-Glo Limited, Norfolk (GB)

( * ) Notice: Subject to any disclaimer, the term of this patent is extended or adjusted under 35 U.S.C. 154(b) by 276 days.

(21) Appl. No.: 12/262,934

(22) Filed: Oct. 31, 2008

(65) Prior Publication Data
US 2010/0109912 A1    May 6, 2010

(51) Int. Cl.
*G08B 21/00* (2006.01)
(52) U.S. Cl. .......................... 340/945; 340/963
(58) Field of Classification Search ............ 340/945, 340/541, 963; 244/118.5
See application file for complete search history.

(56) References Cited

U.S. PATENT DOCUMENTS

| | | | |
|---|---|---|---|
| 5,365,217 A | 11/1994 | Toner | |
| 5,744,381 A | 4/1998 | Tabata et al. | |
| 5,898,367 A | 4/1999 | Berube | |
| 6,676,078 B2 * | 1/2004 | Cordina et al. | 340/945 |
| 6,744,381 B1 | 6/2004 | Collins | |
| 6,812,859 B2 * | 11/2004 | Lay | 340/945 |
| 6,819,264 B2 | 11/2004 | Bissett | |
| 6,980,104 B2 | 12/2005 | Pahl et al. | |
| 7,113,109 B2 * | 9/2006 | Cordina et al. | 340/945 |
| 7,121,509 B2 * | 10/2006 | Cordina et al. | 340/945 |
| 2003/0067392 A1 | 4/2003 | Monroe | |

* cited by examiner

*Primary Examiner* — John A Tweel, Jr.
(74) *Attorney, Agent, or Firm* — Greer, Burns & Crain, Ltd.

(57) ABSTRACT

An aircraft has a passenger cabin security alert system for alerting authorized personnel (flight crew) in the flight deck to a problem in the passenger cabin. The system employs portable wireless transmitter units suitable to be carried or worn on the person of authorized personnel (cabin crew) in the passenger cabin. Each transmitter unit is adapted to transmit a warning signal when actuated that is received by detector units that communicate with control means operable to determine the position P in the passenger cabin of the transmitter unit that has been actuated. The control means activates an alert unit in the flight deck to indicate the existence and position of the problem to authorized personnel (flight crew) in the flight deck.

17 Claims, 2 Drawing Sheets

AIRCRAFT SECURITY

FIELD OF THE INVENTION

This invention relates to aircraft security, and in particular to a system for alerting flight crew in the cockpit of an aircraft of a potentially dangerous situation in the passenger cabin.

BACKGROUND

Recent legislation aimed at improving aircraft security, particularly to reduce the threat posed by hi-jacking, requires the cockpit door to be closed and locked during a flight to prevent unauthorised access to the cockpit. During a flight, communications between the flight crew and the cabin crew are normally via an onboard interphone or intercom system by means of which information can be passed to and from the cockpit without requiring access to the cockpit. While this form of communication is satisfactory under normal flight conditions, it may not be possible for the cabin crew to use the interphone or intercom system to alert the cabin crew to a potentially dangerous situation in the passenger cabin, for example the cabin crew may be overpowered and prevented from accessing the interphone or intercom system in a hi-jack situation.

Accordingly, there is a need for a system that allows the cabin crew to be able to alert the flight crew to a potentially dangerous situation in the cabin without the passengers being aware that the flight crew have been alerted.

It has already been proposed, for example in U.S. Pat. Nos. 6,980,104 and 6,819,624 to employ systems in which the cabin crew are provided with portable transmitter units that can be worn or carried in a concealed location, for example in a pocket, and can be actuated in an emergency to transmit a signal to a receiver unit to produce a visual and/or audible warning in the cockpit of the existence of a potentially dangerous situation in the cabin.

With these portable transmitter units, the cabin crew can provide a discrete warning to the flight crew that there is a problem in the cabin. However, the information available to the flight crew from such visual and/or audible warning is limited. In particular, the signals transmitted from the portable units in these systems do not enable the flight crew to determine the position of the problem in the cabin.

Accordingly, there is a need for a system that not only allows the cabin crew to alert the flight crew when a problem arises but also identifies the actual position of the problem in the aircraft. This is particularly desirable in larger aircraft, especially multi-deck aircraft where it may be possible for the flight crew to remotely isolate an area of the cabin in which there is a problem from the rest of the cabin and reduce the threat or risk to the safety of the aircraft.

It has already been proposed in U.S. Pat. No. 6,819,264 to provide the portable transmitters with unique identification codes that enable the flight crew to know the transmitter from which the warning signal has come. However, this does not provide an indication of the position of the problem as the flight crew member carrying the transmitter can move around the aircraft and may be at any position within the cabin when the alert signal is generated.

It has also been proposed in U.S. Pat. No. 6,819,264 to mount additional buttons at concealed locations within the cabin that can be actuated by the cabin crew to alert the flight crew to a problem and are provided with unique identification codes that enable the flight crew to know the position of the button that has been actuated. However, there may be circumstances in which the cabin crew are prevented from accessing and actuating such hidden buttons to warn the flight crew. Also movement of the cabin crew to the positions where the buttons are hidden may alert the people causing the disturbance that an alert has been sent to the flight crew.

SUMMARY

The present invention has been made from a consideration of the foregoing and seeks to overcome or at least mitigate some of the problems and disadvantages of the known systems for alerting flight crew to a potentially dangerous situation in the cabin.

More especially, it is a preferred aim of the present invention to provide a system that enables the cabin crew to alert the flight crew to the existence and position of a problem in the cabin in a discrete manner.

Furthermore, it is a preferred aim of the present invention to provide a system that employs portable transmitter units carried or worn by the cabin crew in which the risk of a warning signal being transmitted accidentally by inadvertent actuation of the unit is reduced.

According to a first aspect of the invention, there is provided an aircraft comprising a flight deck, a passenger cabin isolated from the flight deck by a bulkhead, and a passenger cabin security alert system for alerting authorised personnel (flight crew) in the flight deck to a problem in the passenger cabin, the system comprising a plurality of portable wireless transmitter units, each transmitter unit being suitable to be carried or worn on the person of authorised personnel (cabin crew) in the passenger cabin and being adapted to transmit a warning signal when actuated, and means arranged to receive a warning signal transmitted by a portable transmitter unit, determine the position in the cabin area of the portable transmitter unit that has been actuated and activate an alert unit in the flight deck for indicating the existence and position of the problem to authorised personnel (flight crew) in the flight deck.

By this invention, the flight crew are provided with information relating to both the existence of a problem and the location of the problem within the cabin area. This information may enable the flight crew to take action to deal with the problem to reduce the risk to the security of the aircraft.

Wireless transmission of a warning signal in an aircraft presents particular problems due to the nature and construction of the aircraft and the presence of passengers and crew.

In one embodiment, the receiver means comprises a plurality of detector units mounted in the passenger cabin at positions spaced apart along the length of the aircraft, each unit being capable of detecting a warning signal transmitted by a portable transmitter unit and control means responsive to detection of the warning signal by at least two units for determining the location of the portable transmitter unit within the cabin area. Providing several detector units along the length of the aircraft reduces the distance a warning signal must travel to be detected thereby reducing the risk of signal detection failure and enables the position of the transmitter unit to be accurately determined based on detection of the signal by at least two units.

Information relating to detection of a warning signal by individual detector units may be communicated to the control means by any suitable means. In one arrangement, the control means may communicate with the detector units by a hard wired link to receive information relating to detection of a warning signal. Each detector unit may be hard wired to the control means separately so that information/data is passed directly to the control means or the detector units may be hard wired to each other and to the control means so that information/data from any of the detector units may pass to the control means through one or more of the remaining detector units. In another arrangement, the control means may communicate with the detector units by a wireless link to receive information relating to detection of a warning signal. Thus, each detector unit may include a transceiver for receiving and transmitting a warning signal. The detector units may be configured to communicate directly with the control means. More preferably, the detector units are configured to communicate with each other and with the control means so that a detected signal can be transmitted to the control means via one or more detector units. Passing the warning signal between detector units increases the range of the system and reduces the risk of signal detection failure.

The control means may be incorporated into one of the detector units which becomes a master unit or control module with the other detector units becoming slave units or relay modules. The master unit may be located in the cabin area at or near to the bulkhead separating the cabin area from the flight deck and configured to communicate with the alert unit in the flight deck by a hard wired link or a wireless link. Alternatively, the master unit and alert unit may be located in the flight deck, preferably integrated in a single unit.

The control means preferably includes a microprocessor for handling information/data received from the detector units and determining the position of the transmitter unit that has generated the warning signal received by the detector units. To avoid errors where more than one transmitter unit is actuated, the warning signal transmitted by each transmitter unit is preferably unique to that unit and the control means is configured to recognise and distinguish between different signals. The microprocessor may be programmable locally or remotely via a suitable interface.

The control means preferably generates a confirm signal in response to receipt of the warning signal that is transmitted and received by the transmitter unit that generated the warning signal. The confirm signal preferably causes the transmitter unit to vibrate giving a tactile indication to the person without providing an indication to anyone else that a warning signal has been sent and confirmed.

The alert unit preferably provides the flight crew with a visual and/or audible warning of the existence of a problem in the cabin area following detection of a warning signal. For example, the alert unit may include a warning light that is illuminated continuously or intermittently (flashing) when a warning signal is detected. Alternatively or additionally the alert unit may include a warning buzzer that emits a sound continuously or intermittently when a warning signal is detected. The visual and/or audible warning is preferably maintained until cancelled by the flight crew. The intensity of the warning may increase over time to reduce the risk of the warning being missed or ignored by the flight crew.

The control means preferably generates an alert signal in response to cancellation of visual and/or audible warning by the flight crew that is transmitted and received by all the portable transmitter units. The alert signal preferably causes the transmitter unit to vibrate giving a tactile indication to each person provided with a unit without giving an indication to anyone else that a warning signal has been sent and confirmed. The alert signal ensures the cabin crew are aware there is a problem and that the flight crew have been informed and are taking appropriate action.

The alert unit preferably provides the flight crew with a visual and/or audible indication of the position in the cabin area of the transmitter unit that has been actuated to generate the detected warning signal. For example, the alert unit may include a screen providing a visual display of the cabin area with the position of the transmitter unit in the cabin area being indicated on the screen by any suitable means. The alert unit may also provide a visual and/or audible indication of the identity of the transmitter unit that has been actuated to generate the detected warning signal. For example, the warning signal transmitted by each transmitter unit may include an identification code unique to that transmitter unit by means of which the control means can identify the transmitter unit and its position in the cabin area. Identifying the transmitter unit may be useful where the units are allocated to specific members of the cabin crew allowing the flight crew to know who has generated the warning signal.

The cabin security alert system may include other functions such as a re-set function, a mute function, a self-test function, and a memory function according to requirements. The re-set function enables the warning signal to be cancelled when the problem no longer exists and return the system to a stand-by condition. The mute function may allow the flight deck crew to switch-off the alert warning after it has been generated where the continued presence of a visual or audible warning may be a distraction to the flight crew. The self-test function may be used for routinely checking the system is operational and may include means in the flight deck area such as a test button on the alert unit to generate a warning signal in the cabin area for detection and display. The memory function may be used to log and store information/data relating to the status and operation of the system on a continuous or intermittent basis. The memory function may be accessible locally by means of a data transfer port for connection to a lap top, palm top or other suitable device when it is desired to access the memory to retrieve stored information/data for any purpose. Alternatively or additionally, the memory function may be accessible remotely via a suitable communication link.

In addition to activating the alert unit in the flight deck, the control means may also transmit a distress signal to provide a warning that the aircraft has a problem. This signal may be transmitted for reception by a monitoring unit on the ground such as air traffic control so that appropriate steps can be taken to track the aircraft and take any steps necessary to reduce the risk to safety presented by the aircraft while the problem persists.

According to a second aspect of the invention, there is provided a portable transmitter unit for an aircraft cabin security alert system, the unit including means for generating and transmitting a warning signal, said means including a manually operable actuator requiring at least two inputs to activate the unit.

Employing at least two inputs to activate the unit helps to prevent inadvertent activation providing an erroneous indication of a problem to the flight crew.

Preferably, the two inputs are provided by separate actuators requiring both actuators to be operated at the same time or within a pre-determined time of each other, for example within a few seconds.

In one arrangement the actuators comprise push buttons that are preferably recessed into the unit to reduce the risk of inadvertent operation if the buttons are pressed against an object or surface while the unit is carried or worn by an authorised person. For example, the unit may be suitable to be carried in a pocket where buttons protruding from the unit could be easily pressed by contact with a part of the aircraft such as a seat in the course of the normal duties of the person carrying the unit.

In a preferred arrangement, the unit is of a size and shape that can be held in the hand and comprises two buttons configured to activate the unit by squeezing the buttons together.

This arrangement allows the unit to be activated with one hand and may also further contribute to a reduced risk of inadvertent operation by requiring a positive intention to squeeze both buttons. In one embodiment, the buttons are provided either side of 'doughnut' shaped unit that helps to prevent inadvertent activation, is more user friendly, and more discreet, in that it can easily be activated with one hand without requiring release of any safety cover protecting the buttons and while being carried or worn in a concealed position.

The alarm unit preferably includes a battery operated transmitter for wirelessly transmitting the warning signal. The battery may be re-chargeable. Alternatively, the battery may be replaceable. The transmitter may transmit an RF signal or any other suitable signal.

The portable transmitter unit of the second aspect of the invention may be employed in the cabin safety alert system according to the first aspect of the invention.

According to a third aspect of the invention, there is provided a passenger cabin security alert system for a passenger vehicle having a control section and a passenger section, the system comprising a plurality of portable wireless transmitter units, each transmitter unit being suitable to be carried or worn on the person of authorised personnel in the passenger section and being adapted to transmit a warning signal when actuated, and means arranged to receive a warning signal transmitted by a portable transmitter unit, determine the position in the passenger section of the portable transmitter unit that has been actuated and activate an alert unit in the control section for indicating the existence and position of the problem to authorised personnel in the control section.

An embodiment of the invention will now be described in more detail by way of example only with reference to the accompanying drawings.

DETAILED DESCRIPTION OF THE EXEMPLARY EMBODIMENTS

Figure 1:
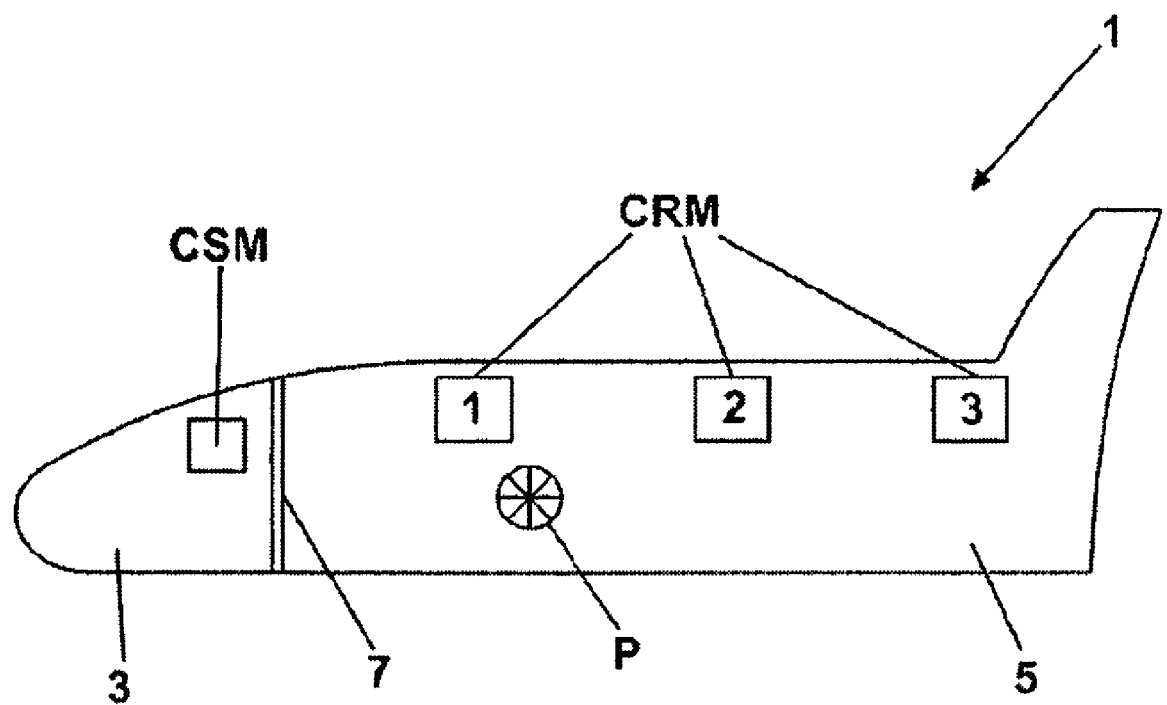
FIG. 1 is a schematic representation of an aircraft provided with a security alert system according to the invention.

Referring first to FIG. 1, an aircraft 1 has a flight deck 3 separated from the passenger cabin 5 by a bulkhead 7 having a door (not shown) for access to the flight deck 3 from the passenger cabin 5. The door is closed during flights to prevent unauthorised access to the flight deck, for example by a hijacker. FIG. 1 shows the aircraft 1 with parts not relevant to an understanding of the invention omitted for clarity.

The aircraft 1 is provided with a security alert system by means of which the cabin crew or other authorised personnel in the passenger cabin 5 can warn the flight crew or other authorised personnel in the flight deck 3 of the existence of a problem in the passenger cabin 5. In this embodiment, the aircraft has one passenger cabin 5 located on a single level (single deck aircraft) but it will be understood the invention has application to aircraft having more than one passenger cabin located on different levels (multi-deck aircraft).

The security alert system includes a master control module designated CSM located in the flight deck 3 and a plurality of relay modules designated CRM1/2/3 located in the passenger cabin 5. In this embodiment, three relay modules CRM1/2/3 are shown spaced apart along the length of the passenger cabin 5. It will be understood that any number of relay modules may be employed depending on the type of aircraft.

Each member of the flight crew is provided with a battery operated portable transceiver or transmitter unit 100 of a size and shape such that it can be easily concealed from view in a position allowing the wearer to access the unit and transmit a warning signal, for example an RF signal, in an unobtrusive manner so as not to draw attention to the fact that a warning signal has been sent. In this embodiment, the portable transceiver units are provided with two actuators such as buttons configured so that the warning signal is only generated if both buttons are operated together or within a pre-determined interval of time, for example within 5 seconds. In this way, the risk of a warning signal being transmitted accidentally is significantly reduced. In a preferred arrangement, the buttons are configured so that they can be operated together by the wearer squeezing the buttons between the thumb and first finger. In this way, the unit can be operated with one hand. In a preferred arrangement, the buttons are recessed within a casing that houses the electronic components for generating the warning signal when the unit is actuated. In this way, the buttons are protected from being inadvertently pressed if the unit comes into contact with a surface while the wearer is carrying out their normal duties within the passenger cabin 5.

Each relay module CRM1/2/3 is provided with a transceiver unit (not shown) capable of receiving and transmitting a warning signal broadcast from any portable unit within range. The control module CSM is also provided with a transceiver unit (not shown) capable of receiving a warning signal broadcast from any portable unit either directly if the portable unit is within range of the control module CSM or relayed via one or more of the relay modules CRM1/2/3 if the portable unit is out of range of the control module CSM.

The transceiver unit of the control module CSM can also transmit a confirm signal back to the portable unit that has generated the warning signal so that the responsible authorised person is aware that the warning signal has been successfully transmitted to and received by the control module CSM. The confirm signal may be generated automatically in response to receipt of the warning signal by the control module CSM and be received directly if the portable unit is within range or relayed via the relay modules CRM1/2/3 if the portable unit is out of range of the control module CSM.

The portable unit may be caused to vibrate to provide a tactile indication to the responsible authorised person that the warning signal has been received without thereby providing an indication to anyone else that a warning signal has been transmitted and acknowledged.

FIG. 1 shows the situation where a portable transmitter unit is actuated at a position "P" within the passenger cabin 5 between two relay modules CRM1 and CRM2. As shown the position "P" is closer to relay module CRM1 than relay module CRM2. Both modules CRM1 and CRM2 pick-up the warning signal generated by the transmitter unit and relay the signal to the control module CSM in the flight deck 3. Due to the closer proximity of the unit to the relay module CRM1, the relay module CRM1 picks-up and relays the signal to the control module CSM before the relay module CRM2. The control module CSM includes a microprocessor or other suitable means of determining the position "P" within the passenger cabin 5 where the warning signal was generated from the signals received from the relay modules CRM1 and CRM2. In some cases, the warning signal may be picked-up by more than two modules. In this case, the microprocessor can identify the two modules closest to the unit and from this determine the position of the unit relative to each of these modules and thus the position of the unit in the passenger cabin 5.

The control module CSM includes an alert unit (not shown) for providing a visual and/or audible indication to the flight crew of the receipt of the warning signal and the position in the passenger cabin 5 of the portable transmitter unit that has generated the warning signal. For example, receipt of the warning signal by the control unit CSM may trigger an audible alarm in the flight deck to alert the flight crew to the existence of a problem in the passenger cabin 5. The audible alarm may be a buzzer or other suitable device and may operate continuously or intermittently until cancelled by the flight crew, for example by operating a button or the like. In this way, a positive action by the flight crew is required to silence the audible alarm thereby ensuring that the flight crew are aware there is a problem in the passenger cabin 5. The audible alarm may be configured to become progressively louder over time until it is cancelled. In this way, the risk of the alarm being missed or ignored is reduced. The visual indication may include a light that flashes continuously or intermittently until cancelled by the flight crew—again requiring a positive action by the flight crew—and which may increase in intensity over time until it is cancelled. Alternatively or additionally, the visual indication may include a display on a screen or the like showing the position where the warning signal has been generated.

The action of the flight crew to cancel the warning signal may trigger the control module CSM to transmit an alert signal generally to all the portable transmitter units so that all of the cabin crew are aware there is a problem in the passenger cabin 5. The alert signal may cause the portable transmitter units to vibrate to draw the attention of the wearer to the alert signal without providing an indication to anyone else of the existence of a problem. This may avoid making the problem worse and/or prevent panic among the passengers. The transmitter units may respond automatically to the alert signal and the control unit may check for responses and provide an indication to the flight crew of the responses received. In this way, the flight crew can identify if any units have not received the alert signal and from this information determine the number of cabin crew that are alerted to the situation. The control unit CSM may stop generating the alert signal automatically after a pre-determined period of time or when responses have been received from all of the portable transmitter units. Alternatively, the alert signal may be cancelled by the flight crew.

Figure 2:
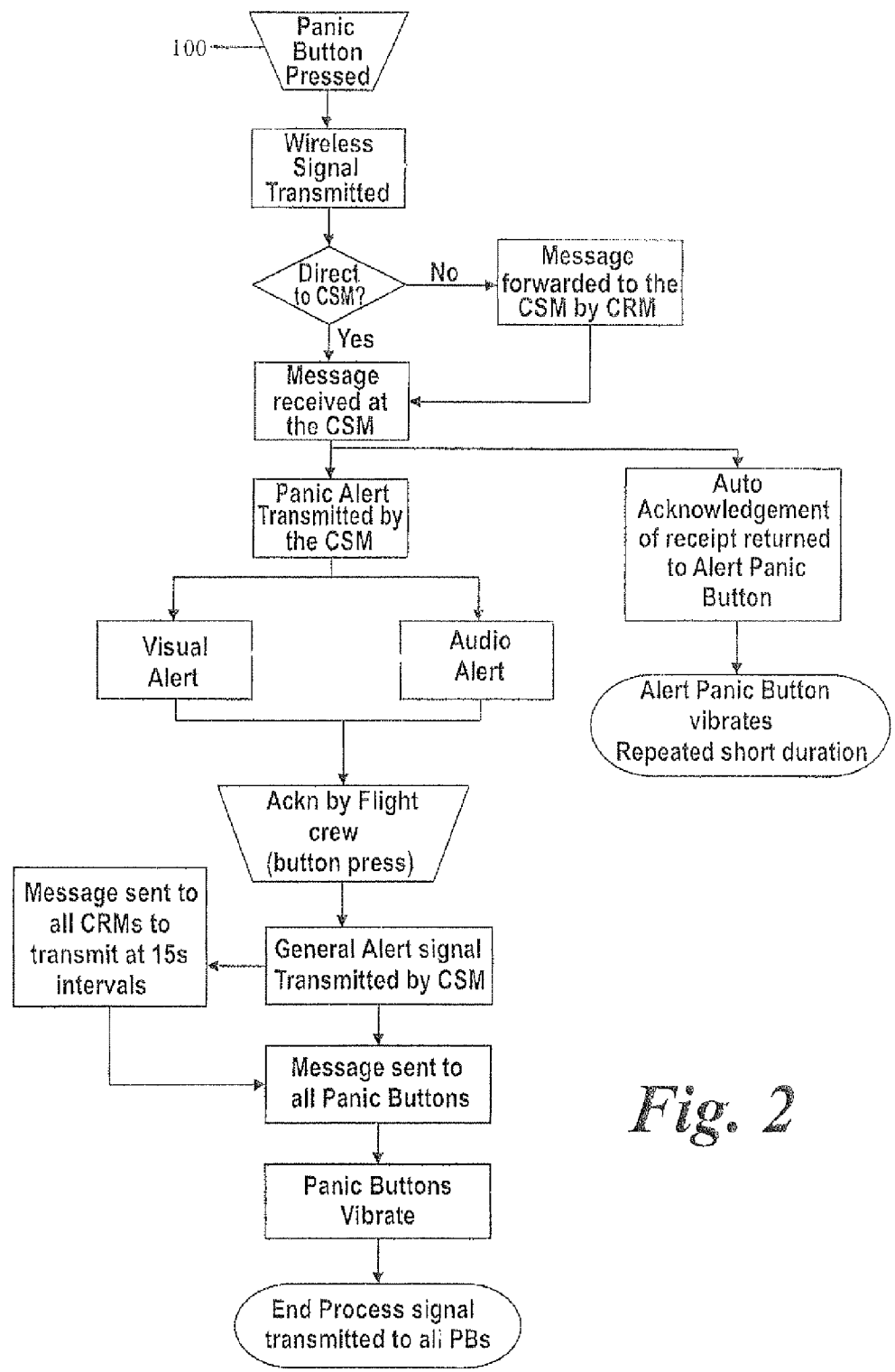
FIG. 2 is a flow chart depicting the operation of the security alert system.

FIG. 2 shows schematically one possible sequence of operation of the system when the warning signal is first generated by actuating a portable transmitter unit in the passenger cabin. It will be understood this is not limiting on the scope of the invention and that other functions may be provided for in the sequence of operations. For example, on receipt of the warning signal from the portable transmitter unit, the control module CSM may generate a distress signal that is transmitted for reception by another aircraft or by a remote tracking station to enable an aircraft with an on-board problem to be identified allowing appropriate action to be taken.

Although the invention has been described in connection with an aircraft, it will be understood that the cabin security alert system may have application to other passenger vehicles where it is desirable to provide a warning to the driver or other personnel in control of the vehicle of the existence of a problem in another part of the vehicle. For example, the cabin security alert system may have application to trains, buses, coaches, ships.

We claim:

1. An aircraft comprising a flight deck, a passenger cabin isolated from the flight deck by a bulkhead, and a passenger cabin security alert system for alerting authorized personnel (flight crew) in the flight deck to a problem in the passenger cabin, the system comprising a plurality of portable wireless transmitter units, each transmitter unit being suitable to be carried or worn on the person of authorized personnel (cabin crew) in the passenger cabin and being adapted to transmit a warning signal when actuated, and means arranged to receive a warning signal transmitted by a portable transmitter unit, determine the position in the cabin area of the portable transmitter unit that has been actuated and activate an alert unit in the flight deck for indicating the existence and position of the problem to authorized personnel (flight crew) in the flight deck, wherein the receiver means comprises a plurality of detector units including a master control module and at least one relay module, each detector unit being capable of detecting a warning signal transmitted by a portable transmitter unit, and control means responsive to detection of the warning signal by at least two detector units for determining the location of the portable transmitter unit within the cabin area.

2. An aircraft according to claim 1 wherein the control means is configured for handling information/data received from the detector units and determining the position of the transmitter unit that has generated the warning signal received by the detector units, and wherein the warning signal transmitted by each transmitter unit is unique to that unit and the control means is configured to recognise and distinguish between different signals.

3. An aircraft according to claim 1 wherein, the at least one relay module detects and forwards the warning signal to the master control module by a hard wired link or by a wireless link.

4. An aircraft according to claim 1 wherein the alert unit provides a visual and/or audible warning of the existence of a problem in the cabin area following detection of a warning signal.

5. An aircraft according to claim 1 wherein the alert unit provides a visual and/or audible indication of the position in the cabin area of the transmitter unit that has been actuated to generate the detected warning signal.

6. An aircraft according to claim 5 wherein, the alert unit provides a visual display of the cabin area and the position of the transmitter unit in the cabin area that has been actuated.

7. An aircraft according to claim 1 wherein the alert unit provides a visual and/or audible indication of the identity of the transmitter unit that has been actuated to generate the detected warning signal.

8. An aircraft according to claim 7 wherein the warning signal transmitted by each transmitter unit includes an identification code unique to that transmitter unit by means of which the control means can identify the transmitter unit and its position in the cabin area.

9. An aircraft according to claim 1 wherein the cabin security alert system is configured to cancel the warning signal when the problem no longer exists and return the system to a stand-by condition.

10. An aircraft according to claim 2 wherein the control means is responsive to receipt of the warning signal to generate a confirm signal that is received by the portable transmitter unit that generated the warning signal to confirm receipt of the warning signal.

11. An aircraft according to claim 10 wherein the confirm signal causes the portable transmitter unit to vibrate.

12. An aircraft according to claim 2 wherein the control means is operable to generate an alert signal that is received by all the portable transmitter units.

13. An aircraft according to claim 1 wherein each portable transmitter unit can be held in the hand and is configured for generating and transmitting a warning signal.

14. A passenger cabin security alert system for a passenger vehicle having a control section and a passenger section, the system comprising a plurality of portable wireless transmitter units, each transmitter unit being suitable to be carried or worn on the person of authorized personnel in the passenger section and being adapted to transmit a warning signal when actuated, and means arranged to receive a warning signal transmitted by a portable transmitter unit, determine the position in the passenger section of the portable transmitter unit that has been actuated and activate an alert unit in the control section for indicating the existence and position of the problem to authorized personnel in the control section, wherein the receiver means comprises a plurality of detector units including a master control module and at least one relay module, each detector unit being capable of detecting a warning signal transmitted by a portable transmitter unit, and wherein the location of the portable transmitter unit within the cabin area is determined in response to detection of the warning signal by at least two detector units.

15. An aircraft according to claim 1 wherein the cabin security alert system is configured to log and store information/data relating to the status and operation of the system on a continuous or intermittent basis.

16. An aircraft according to claim 1 wherein the cabin security alert system is configured to check whether the system is operational.

17. An aircraft according to claim 1 wherein each portable transmitter unit is configured to prevent inadvertent activation providing an erroneous indication of a problem to the flight crew.

* * * * *